(12) United States Patent
Orendi et al.

(10) Patent No.: US 10,232,476 B2
(45) Date of Patent: Mar. 19, 2019

(54) CONTACT HOLDER DEVICE FOR A HAND-HELD POWER TOOL

(71) Applicant: Robert Bosch GmbH, Stuttgart (DE)

(72) Inventors: Erwin Orendi, Esslingen (DE);
Juergen Dietel, Stuttgart (DE);
Benjamin Nikolas Fischle, Murr (DE);
Elisabeth Michl, Waldenbuch (DE);
Michael Weiss, Stuttgart (DE); Selim Mustafa, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/650,348

(22) Filed: Jul. 14, 2017

(65) Prior Publication Data
US 2018/0029179 A1 Feb. 1, 2018

(30) Foreign Application Priority Data

Aug. 1, 2016 (DE) .......................... 10 2016 214 106

(51) Int. Cl.
| | |
|---|---|
| *H01R 12/00* | (2006.01) |
| *B23Q 1/00* | (2006.01) |
| *B23Q 11/00* | (2006.01) |
| *B25F 5/02* | (2006.01) |
| *B25F 5/00* | (2006.01) |

(52) U.S. Cl.
CPC ........ *B23Q 1/0009* (2013.01); *B23Q 11/0046* (2013.01); *B25F 5/00* (2013.01); *B25F 5/02* (2013.01)

(58) Field of Classification Search
CPC ...... B23Q 1/0009; B23Q 11/0046; B25F 5/02
USPC .......................................................... 439/66
See application file for complete search history.

(56) References Cited

U.S. PATENT DOCUMENTS

| | | | | |
|---|---|---|---|---|
| 4,266,155 A | * | 5/1981 | Niemela | H02K 5/148 310/239 |
| 5,076,805 A | * | 12/1991 | Welch | B25F 5/02 310/50 |
| 5,769,657 A | * | 6/1998 | Kondo | H01M 2/1055 320/112 |
| 6,057,608 A | * | 5/2000 | Bailey, Jr. | B25F 5/02 307/43 |
| 6,075,341 A | * | 6/2000 | White | H01M 2/1055 320/107 |

(Continued)

FOREIGN PATENT DOCUMENTS

| | | |
|---|---|---|
| DE | 10 2014 223 043 A1 | 5/2016 |
| EP | 2 524 773 A2 | 11/2012 |
| EP | 2 759 379 A1 | 7/2014 |

*Primary Examiner* — Abdullah A Riyami
*Assistant Examiner* — Vladimir Imas
(74) *Attorney, Agent, or Firm* — Maginot, Moore & Beck LLP

(57) ABSTRACT

A contact holder device for a hand-held power tool includes at least one main body that is disposed inside a housing unit of the hand-held power tool. The main body accommodates or fixes contact elements configured to transmit data signals and/or electrical energy. The main body has at least one disposition plane and at least one group of contact elements are disposed in the disposition plane. The main body has at least one further disposition plane and at least one further group of contact elements are disposed in the further disposition plane. The further disposition plane is disposed in an offset manner in relation to the disposition plane.

10 Claims, 4 Drawing Sheets

(56) References Cited

U.S. PATENT DOCUMENTS

| | | | |
|---|---|---|---|
| 6,168,881 B1* | 1/2001 | Fischer | B25F 5/02 292/219 |
| 6,181,032 B1* | 1/2001 | Marshall | B25F 3/00 200/321 |
| 6,237,698 B1* | 5/2001 | Carrier | B25F 5/02 173/171 |
| 6,296,065 B1* | 10/2001 | Carrier | B25F 5/02 173/171 |
| 6,304,058 B2* | 10/2001 | Watson | B25F 5/02 320/114 |
| 6,329,788 B1* | 12/2001 | Bailey, Jr. | B25F 5/02 307/43 |
| 6,350,149 B1* | 2/2002 | Nakane | H01M 2/1022 439/500 |
| 6,525,511 B2* | 2/2003 | Kubale | B25F 5/02 320/112 |
| 6,534,885 B2* | 3/2003 | Nakagawa | H01M 2/1022 307/150 |
| 6,562,509 B1* | 5/2003 | Eggert | H01M 2/1016 320/114 |
| 6,615,930 B2* | 9/2003 | Bongers-Ambrosius | B08B 15/04 173/198 |
| 6,840,335 B1* | 1/2005 | Wu | B25F 5/02 173/217 |
| 6,876,173 B2* | 4/2005 | Mastaler | B25F 5/02 320/114 |
| 7,182,150 B2* | 2/2007 | Grossman | B23Q 1/0009 173/171 |
| 7,273,159 B2* | 9/2007 | Brotto | B25B 21/00 173/171 |
| 7,354,226 B2* | 4/2008 | Britz | B23Q 11/0046 144/252.1 |
| 7,443,137 B2* | 10/2008 | Scott | B25F 5/02 320/114 |
| 8,281,873 B2* | 10/2012 | Ullrich | B25D 16/006 173/104 |
| 9,444,269 B2* | 9/2016 | Wohltmann | H02J 7/0044 |
| 9,505,095 B2* | 11/2016 | Machida | B23Q 11/0046 |
| 2004/0072064 A1* | 4/2004 | Turner | H01M 2/1022 429/97 |
| 2005/0264260 A1* | 12/2005 | Zick | H01M 2/1016 320/114 |
| 2006/0151189 A1* | 7/2006 | Wu | H01M 2/1022 173/217 |
| 2007/0224492 A1 | 9/2007 | Scott et al. | |
| 2012/0292070 A1 | 11/2012 | Ito et al. | |
| 2014/0159662 A1 | 6/2014 | Furui et al. | |
| 2015/0132988 A1 | 5/2015 | Burger et al. | |

\* cited by examiner

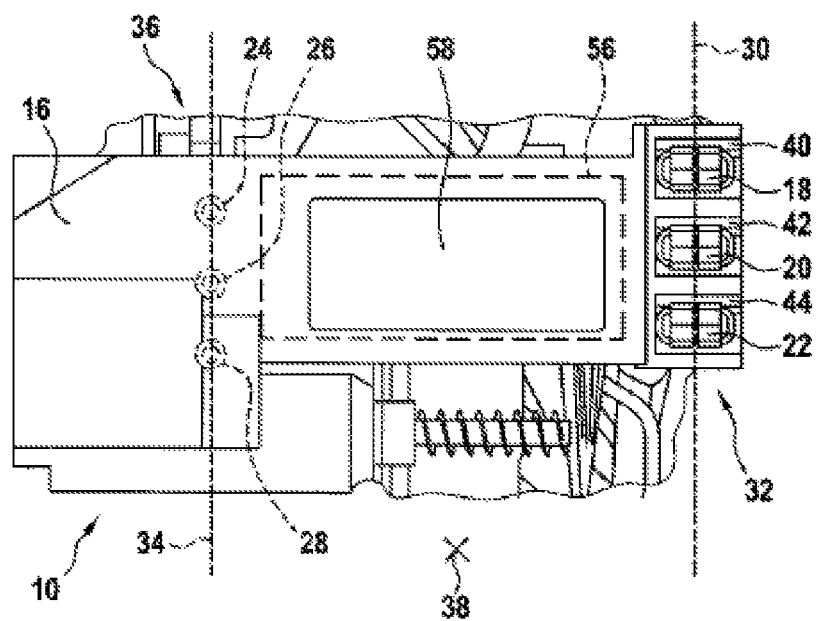

CONTACT HOLDER DEVICE FOR A HAND-HELD POWER TOOL

This application claims priority under 35 U.S.C. § 119 to patent application no. DE 10 2016 214 106.6, filed on Aug. 1, 2016 in Germany, the disclosure of which is incorporated herein by reference in its entirety.

BACKGROUND

A contact holder device for a hand-held power tool is already known from DE 10 2014 223 043 A1. The known contact holder device comprises at least one main body that, in particular, can be disposed inside a housing unit of the hand-held power tool, for accommodating and/or fixing contact elements for transmitting data signals and/or electrical energy, the main body having at least one disposition plane, in which at least one group of contact elements is disposed.

SUMMARY

The disclosure is based on a contact holder device for a hand-held power tool, having at least one main body that, in particular, can be disposed inside a housing unit of the hand-held power tool, for accommodating and/or fixing contact elements for transmitting data signals and/or electrical energy, the main body having at least one disposition plane, in which at least one group of contact elements is disposed.

It is proposed that the main body have at least one further disposition plane, in which at least one further group of contact elements is disposed, and which is disposed in an offset manner in relation to the disposition plane. A "disposition plane" is to be understood to mean, in particular, a plane that runs through at least two contact elements, in particular through at least two contact elements of a group of contact elements, and/or that intersects at least two contact elements, in particular at least two cross-sectional axes of at least two contact elements of a group. Preferably, the disposition plane runs and/or intersects at least three or more contact elements, in particular three or more contact elements of a group of contact elements. A "group of contact elements" is to be understood to mean, in particular, an arrangement of contact elements that, for the purpose of fulfilling at least one common function such as, for example, for transmitting electrical energy, or the like, act in combination, and/or that are disposed in a manner in which at least two directly adjacent contact elements have a minimum distance relative to each other, which, in particular, is less than 100 mm, preferably less than 50 mm, and particularly preferably less than 10 mm. The contact element may be realized as a plug connector, as a contact socket, as a cable, as a cable lug, or as another element, considered appropriate by persons skilled in the art, that is designed for transmitting data signals and/or electrical energy. "Designed" is to be understood to mean, in particular, specially programmed, specially configured and/or specially equipped. That an object is designed for a particular function is to be understood to mean, in particular, that the object fulfils and/or executes this particular function in at least one application state and/or operating state.

A cross-sectional axis of a contact element preferably runs in a plane of main extent of the contact element. A "plane of main extent" of a structural unit is to be understood to mean, in particular, a plane parallel to a largest lateral face of a smallest notional cuboid that only just fully encloses the structural unit and that, in particular, runs through the central point of the cuboid. Preferably, a cross-sectional axis of a contact element runs, in particular all cross-sectional axes of a group of contact elements run, in the disposition plane or in the further disposition plane, in particular in dependence on a disposition of the respective contact element in the disposition plane or in the further disposition plane. Preferably, at least one group of at least three contact elements is disposed in the disposition plane. Preferably, at least one further group of at least three contact elements is disposed in the further disposition plane. It is also conceivable, however, for a number of contact elements other than three that, in particular, constitute a group of contact elements, to be disposed in the disposition plane and/or in the further disposition plane.

The disposition plane and the further disposition plane are preferably defined by the main body, in particular by a geometric disposition of contact-element accommodating regions of the main body, which are designed to accommodate and/or fix respectively at least one contact element of at least one group of contact elements. The main body is preferably realized as a single component part. It is also conceivable, however, for the main body to be composed of a plurality of sub-assemblies that are connected to each other in a force-fitting and/or form-fitting manner, in particular fixed to each other.

The design according to the disclosure makes it possible, advantageously, to realize a compact contact holder device that enables differing groups of contact elements to be accommodated in an advantageous manner. Advantageously, spatial separation of groups of contact elements can be achieved. Advantageously, a large number of groups of contact elements can be disposed on a small structural space. Advantageous utilization of an available structural space can be achieved by simple design means.

Furthermore, it is proposed that the disposition plane and the further disposition plane be disposed such that they are offset parallelwise in relation to each other, in particular as viewed along a direction that is at least substantially perpendicular to a connection direction of the contact elements. The expression "substantially perpendicular" is intended here to define, in particular, an alignment of a direction relative to a reference direction, the direction and the relative direction, in particular as viewed in one plane, enclosing an angle of 90° and the angle having a maximum deviation of, in particular, less than 8°, advantageously less than 5°, and particularly advantageously less than 2°. Advantageously, the disposition plane and the further disposition plane are at least substantially parallel relative to each other. "Substantially parallel" is to be understood here to mean, in particular, an alignment of a direction relative to a reference direction, in particular in one plane, the direction deviating with respect to the reference direction by, in particular, less than 8°, advantageously less than 5°, and particularly advantageously less than 2°. Preferably, the disposition plane and the further disposition plane are disposed such that they are offset relative to each other along a direction that is at least substantially perpendicular to a connection direction of at least one group of contact elements. A "connection direction" is to be understood to mean, in particular, a direction along which the group of contact elements can be connected to corresponding contact elements of another device, in particular of an optional function module. An "optional function module" in this context is to be understood to mean, in particular, a module such as, for example, an assembly and/or item of equipment that can optionally be coupled to the hand-held power tool that comprises the contact holder device. Preferably, it is to be understood to mean, in particular, a module that is designed, when in a coupled state, to provide an additional function, but that is not relevant to a fundamental function of the hand-held power tool. Various optional function modules, considered appropriate by persons skilled in the art, are conceivable. In particular, the optional function module is realized as an optional vacuuming module. Particularly preferably, the optional function module is realized as a partly autonomous vacuuming module that, solely for the purpose of energy supply, can be coupled to the hand-held power tool, in particular to contact elements accommodated and/or fixed on the contact holder device, and that has an internal drive unit for generating a vacuuming fluid flow. In addition, it is conceivable that control of the optional vacuuming module, such as, in particular, switching-on or switching-off of the vacuuming, is additionally effected via the hand-held power tool, in particular via contact elements accommodated and/or fixed on the contact holder device. Such a design makes it possible, advantageously, to realize a compact contact holder device that enables differing groups of contact elements to be accommodated in an advantageous manner. Advantageously, spatial separation of groups of contact elements can be achieved. Advantageously, a large number of groups of contact elements can be disposed on a small structural space. Advantageous utilization of an available structural space can be achieved by simple design means.

Further, it is proposed that the main body comprise individual accommodating chambers, disposed in the disposition plane, for accommodating individual contact elements of the group of contact elements, and/or individual accommodating chambers, disposed in the further disposition plane, for accommodating individual contact elements of the further group of contact elements. The individual accommodating chambers preferably constitute the contact-element accommodating regions of the main body. Preferably, the individual accommodating chambers are designed to shield the contact elements. The design according to the disclosure makes it possible, advantageously, to achieve spatial separation of groups of contact elements. Advantageously, a large number of groups of contact elements can be disposed on a small structural space. Advantageous utilization of an available structural space can be achieved by simple design means. It is possible to realize a shielding of the contact elements that is of a simple design and that, in particular, is independent of an additional shielding element.

It is additionally proposed that the main body have at least one accommodating region for at least one shielding and/or filter element for shielding individual contact elements of the group of contact elements and/or of the further group of contact elements and/or for filtering data signals. Preferably, the accommodating region is realized as an accommodating chamber, in which at least one shielding and/or filter element, realized as a ferrite core and/or filter circuit board, can be disposed. It is also conceivable, however, for the accommodating region and/or the shielding and/or filter element to be of a different design, considered appropriate by persons skilled in the art. Additionally or alternatively, a suppression element, or a different element, considered appropriate by persons skilled in the art, may be disposed in the accommodating region. The accommodating region is preferably disposed, spaced apart relative to the individual accommodating chambers, on the main body. Preferably, the accommodating region is disposed in an offset manner relative to the individual accommodating chambers, along a direction that is at least substantially parallel to the connection direction. Alternatively or additionally, it is conceivable for the accommodating region to be disposed in an offset manner relative to the individual accommodating chambers, along a direction that is at least substantially perpendicular to the connection direction. Particularly advantageously, shielding and/or filtering can be realized by means of the design according to the disclosure. Advantageously, it is made possible to achieve spatial separation of function groups. Advantageously, a large number of most diverse function groups can be disposed on a small structural space. Advantageous utilization of an available structural space can be achieved by simple design means. It is possible to realize a shielding of the contact elements that is of a simple design.

Furthermore, it is proposed that the accommodating region be disposed, at least partly, in the further disposition plane. Preferably, the further disposition plane intersects the accommodating region. Preferably, the accommodating region is disposed in an offset manner relative to the disposition plane, along a direction that is at least substantially perpendicular to the disposition plane and/or the further disposition plane. Particularly advantageously, shielding and/or filtering can be realized by means of the design according to the disclosure. Advantageously, it is made possible to achieve spatial separation of function groups. Advantageously, a large number of most diverse function groups can be disposed on a small structural space. Advantageous utilization of an available structural space can be achieved by simple design means. It is possible to realize a shielding of the contact elements that is of a simple design.

Further, it is proposed that the main body have at least one electronics accommodating region, in which at least one electronic unit, in particular a Bluetooth unit and/or an RFID unit, can be disposed. Particularly preferably, the electronics accommodating region is realized as an accommodating chamber, in which additional units can be disposed. Advantageously, a large number of most diverse function groups can be disposed on a small structural space. Advantageous utilization of an available structural space can be achieved by simple design means.

It is additionally proposed that the main body comprise at least one electronics accommodating region that is disposed between the disposition plane and the further disposition plane, in particular as viewed along a direction that is at least substantially perpendicular to a connection direction of the contact elements. Preferably, the electronics accommodating region is disposed between the disposition plane and the further disposition plane, in particular along a direction that is at least substantially perpendicular to the disposition plane and/or the further disposition plane. The electronics accommodating region is preferably disposed, along the direction that is at least substantially perpendicular to the disposition plane and/or the further disposition plane, between the individual accommodating chambers of the disposition plane and the individual accommodating chambers of the further disposition plane. The electronics accommodating region is preferably disposed, along a direction that is at least substantially perpendicular to the connection direction, between the individual accommodating chambers of the disposition plane and the individual accommodating chambers of the further disposition plane. The design according to the disclosure makes it possible, advantageously, to achieve spatial separation of function groups. Advantageously, a large number of most diverse function groups can be disposed on a small structural space. Advantageous utilization of an available structural space can be achieved by simple design means.

Furthermore, it is proposed that the main body constitute, at least partly, an insulator between the contact elements.

The main body is preferably designed to act as a thermal and/or electrical insulator between the contact elements, in particular at least between the contact elements of the group of contact elements and the contact elements of the further group of contact elements. In particular, the main body is designed to act as a thermal and/or electrical insulator between the individual contact elements of the group of contact elements and/or between the individual contact elements of the further group of contact elements. Preferably, the main body is made of a thermostable plastic, a thermally conductive plastic or other material, considered appropriate by persons skilled in the art. Alternatively or additionally, it is also conceivable for the main body to constitute an insulator in relation to other component parts of the portable power tool that, in particular, are disposed adjacently to the contact elements. The design according to the disclosure makes it possible, advantageously, to realize a high degree of safety against overheating and/or against an electrical short circuit. Advantageously, it is made possible to achieve spatial separation of function groups. Advantageously, a large number of most diverse function groups can be disposed on a small structural space. Advantageous utilization of an available structural space can be achieved by simple design means.

It is additionally proposed that the contact holder device have at least one cooling unit, disposed on the main body, for removing heat of the contact elements. In particular, the cooling unit is realized as a passive cooling unit. Preferably, the cooling unit is realized as a cooling fin unit. The cooling unit may be integral with the main body, or realized separately from the latter and fixed thereto. It is also conceivable, however, for the cooling unit to be realized as an active cooling unit such as, for example, a cooling fan, or the like. The design according to the disclosure makes it possible, advantageously, to realize a high degree of safety against overheating. It is possible to achieve an advantageous removal of heat, in order, advantageously, to protect component parts that are disposed on the main body. Advantageously, it is made possible to achieve spatial separation of function groups. Advantageous utilization of an available structural space can be achieved by simple design means.

Additionally proposed is a hand-held power tool, having at least one contact holder device according to the disclosure, and having at least one housing unit, the contact holder device being disposed, at least partly, inside the housing unit. A "hand-held power tool" is to be understood here to mean, in particular, a power tool, for performing work on workpieces, that can be transported by an operator without the use of a transport machine. The hand-held power tool has, in particular, a mass of less than 40 kg, preferably less than 10 kg, and particularly preferably less than 5 kg. The hand-held power tool may be realized as an angle grinder, as a hammer drill and/or chipping hammer, as a demolition hammer, as a random-orbit sander, as a jigsaw, as a saber saw, as a garden machine, as a power planer, or as another hand-held power tool, considered appropriate by persons skilled in the art.

The design according to the disclosure makes it possible, advantageously, to realize a compact contact holder device that enables differing groups of contact elements to be accommodated in an advantageous manner. Advantageously, spatial separation of groups of contact elements can be achieved. Advantageously, a large number of groups of contact elements can be disposed on a small structural space. Advantageous utilization of an available structural space can be achieved by simple design means.

The contact holder device according to the disclosure and/or the hand-held power tool according to the disclosure are/is not intended in this case to be limited to the application and embodiment described above. In particular, the contact holder device according to the disclosure and/or the hand-held power tool according to the disclosure may have individual elements, component parts and units, and procedure steps, that differ in number from a number stated herein, in order to fulfill an operating principle described herein. Moreover, in the case of the value ranges specified in this disclosure, values lying within the stated limits are also to be deemed as disclosed and applicable in any manner.

BRIEF DESCRIPTION OF THE DRAWINGS

Further advantages are disclosed by the following description of the drawings. An exemplary embodiment of the disclosure is represented in the drawings. The drawings, the description, and the claims contain numerous features in combination. Persons skilled in the art will also expediently consider the features individually and combine them to create appropriate further combinations.

There are shown in.

DETAILED DESCRIPTION

Figure 1:
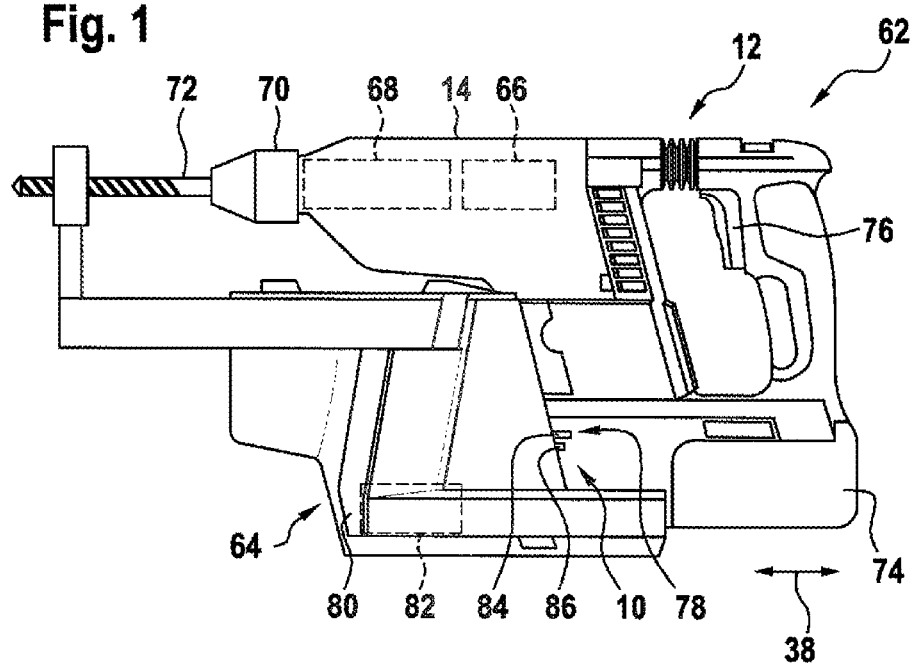
FIG. 1 a system, having an ancillary module, and having a hand-held power tool that has a contact holder device according to the disclosure, in a schematic representation, FIG. 2 the hand-held power tool having the contact holder device according to the disclosure, in a schematic representation, FIG. 3 a detail view of the contact holder device according to the disclosure, in a schematic representation, FIG. 4 a detail view of the contact holder device according to the disclosure, in which a group of contact elements are disposed in a disposition plane of a main body of the contact holder device, in a schematic representation, FIG. 5 a detail view of the main body, separate from group of contact elements that is disposed in the disposition plane, in a schematic representation, FIG. 6 a detail view of the contact holder device, in which a further group of contact elements are disposed in a further disposition plane of the main body, in a schematic representation, and FIG. 7 a detail view of an electronics accommodating region of the contact holder device, in a schematic representation.

FIG. 1 shows a system 62, having an optional function module 64, and having a hand-held power tool 12. The hand-held power tool 12 comprises at least one contact holder device 10 and at least one housing unit 14, the contact holder device 10 being disposed, at least partly, inside the housing unit 14. The hand-held power tool 12 is preferably realized as a hammer drill. In principle, however, a different design of the hand-held power tool 12, considered appropriate by persons skilled in the art, would also be conceivable, such as, for example, as a power drill, saw, planer, screwdriver, cutter, sander, angle grinder, garden appliance and/or multifunction tool. The hand-held power tool 12 has a drive unit 66, a percussion unit 68 and a housing unit 14. The hand-held power tool 12 additionally has a tool receiver 70, in which an insert tool 72 can be disposed, in a manner already known to persons skilled in the art. The drive unit 66 comprises a motor, not shown further, in particular an electric motor, and a transmission unit, not shown further. When the hand-held power tool 12 is in an operating state, the tool receiver 70 is driven, in particular driven in rotation, by means of the motor and the transmission unit. In addition, the percussion unit 68 is driven by means of the motor and the transmission unit. Furthermore, the hand-held power tool 12 has an energy supply unit 74. By means of the energy supply unit 74, the drive unit 66, in particular the motor of the drive unit 66, is supplied with energy, in particular electrical energy, during operation. The energy supply unit 74 is realized as a rechargeable battery device. The energy supply unit 74 is realized as a rechargeable battery. The hand-held power tool 12 additionally has an operating switch 76. By means of the operating switch 76, an operator can control an energy supply to the drive unit 66 by the energy supply unit 74.

Figure 2:
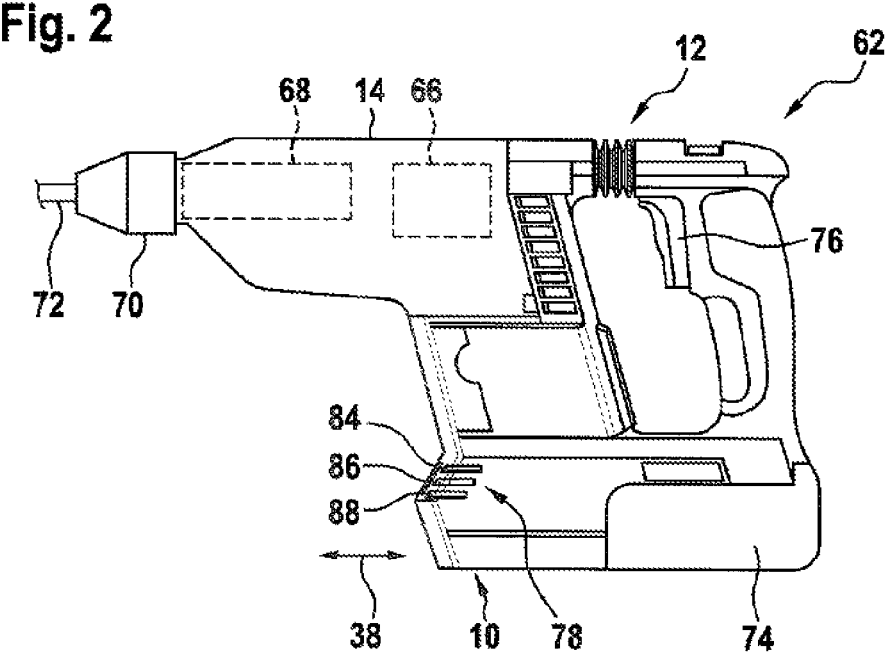

The hand-held power tool 12 additionally has the contact holder device 10. The contact holder device 10 for the hand-held power tool 12 comprises at least one main body 16 that, in particular, can be disposed inside the housing unit 14 of the hand-held power tool 12, for accommodating and/or fixing contact elements 18, 20, 22, 24, 26, 28 for transmitting data signals and/or electrical energy, the main body 16 having at least one disposition plane 30, in which at least one group 32 of contact elements 18, 20, 22 is disposed (FIGS. 3 to 7). The hand-held power tool 12 has a coupling device 78. The coupling device 78 is designed to couple the optional function module 64 to the hand-held power tool 12. By means of the contact holder device 10, which is disposed in the region of the coupling device 78, the optional function module 64 can be connected to the energy supply unit 74. The optional function module 64 can be supplied, at least, with electrical energy of the energy supply unit 74 of the hand-held power tool 12 via the contact elements 18, 20, 22, 24, 26, 28, in particular by means of the group 32 of contact elements 18, 20, 22, accommodated and/or fixed by means of the contact holder device 10. The further group 34 of contact elements 24, 26, 28 are designed, at least, to supply energy to the drive unit 66. The optional function module 64 does not require an additional energy supply. The optional function module 64 is realized as an optional vacuum-cleaning module. In principle, however, a different realization of the optional function module 64, considered appropriate by persons skilled in the art, would also be conceivable. The optional function module 64 can be fixed to the hand-held power tool 12 by means of securing means, not represented in greater detail. The optional function module 64 has a housing 80. In addition, the optional function module 64 has an electrical suction unit 82, by means of which, in particular, removed workpiece material, produced when work is performed on a workpiece, can be sucked into a collecting container, not represented in greater detail. The collecting container is disposed inside the housing 80. In principle, however, an external collecting container would also be conceivable. In FIG. 2, the optional function module 64 has been removed from the hand-held power tool 12, and the hand-held power tool 12 is shown on its own, with contacting openings 84, 86, 88 being visible in the housing unit 14 of the hand-held power tool 12. Through the contacting openings 84, 86, 88, counter-contact elements (not represented in greater detail here) of the optional function module 64 can be contacted to contact elements 18, 20, 22, 24, 26, 28, which are accommodated and/or fixed by means of the contact holder device 10, in particular to contact elements 18, 20, 22 of the group 32 of contact elements 18, 20, 22.

The contact holder device 10 is disposed in the housing unit 14 of the hand-held power tool 12. The contact holder device 10 is fastened inside the housing unit 14 of the hand-held power tool 12 in a manner already known to persons skilled in the art. A labyrinth is realized in a transition region between the housing unit 14 and the main body 16 of the contact holder device 10. This is intended to prevent the ingress of dust. The main body 16 is designed to accommodate contact elements 18, 20, 22, 24, 26, 28. With regard to contacting of the hand-held power tool 12 and the optional function module 64, reference may be made to the description of DE 10 2014 223 043 A1, the description of which is to be deemed to be part of this disclosure, at least in respect of the disposition, design and/or operating principle of the contact elements 18, 20, 22 of the group 32 of contact elements 18, 20, 22 for connection to the optional function module 64.

Figure 3:
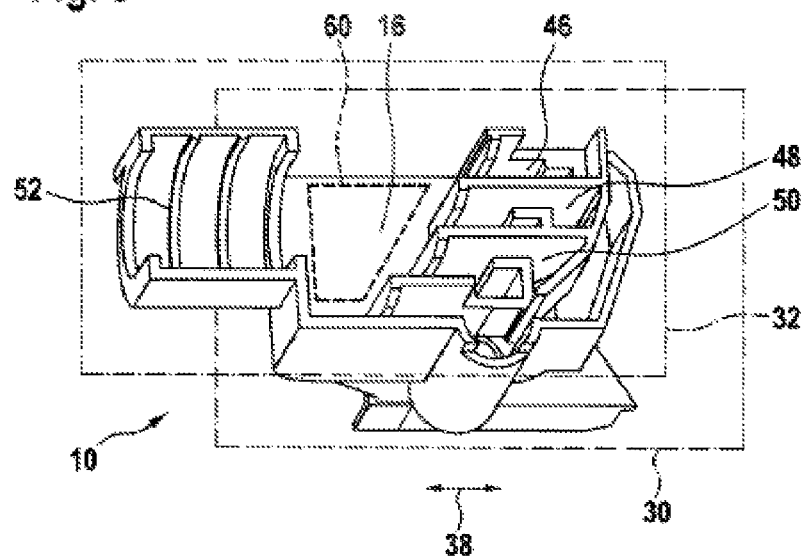
Figure 4:
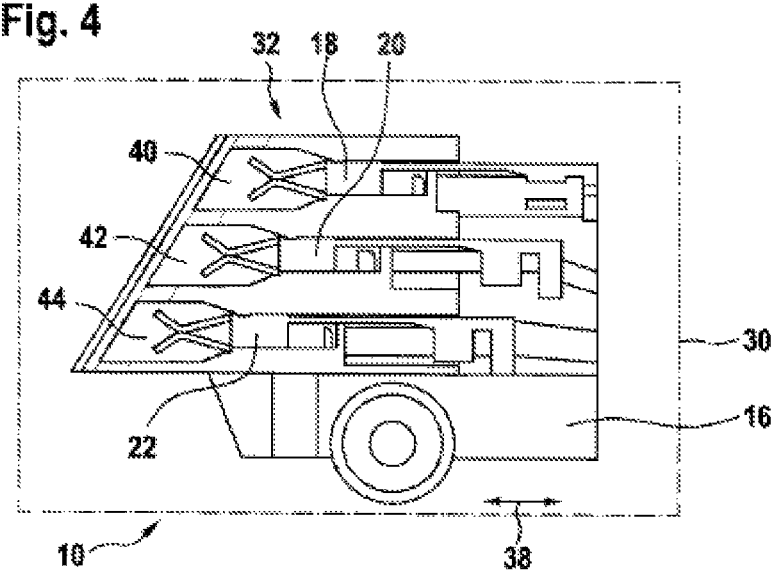
Figure 5:
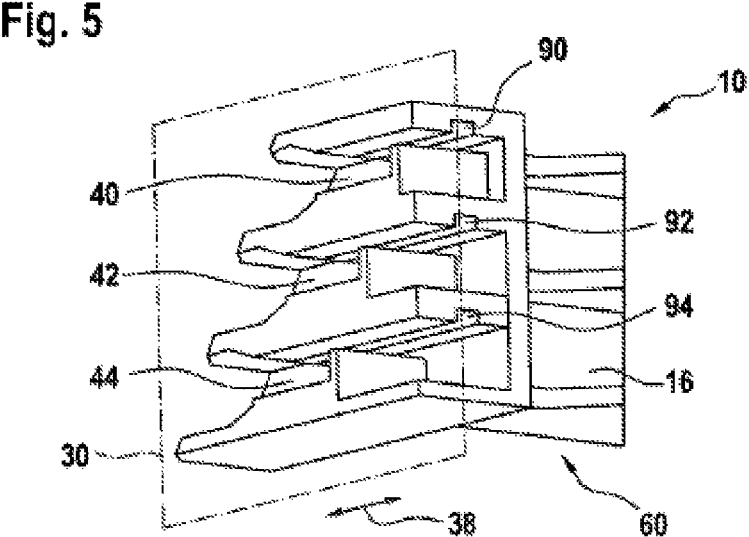

FIG. 3 shows a detail view of the contact holder device 10, separated from the contact elements 18, 20, 22, 24, 26, 28. The main body 16 has, in particular in addition to the disposition plane 30, at least one further disposition plane 34, in which at least one further group 36 of contact elements 24, 26, 28 is disposed, and which is disposed in an offset manner in relation to the disposition plane 30. The further group 36 of contact elements 24, 26, 28 may be designed to transmit data signals between the hand-held power tool 12 and the optional function module 64, and/or to transmit electrical energy to internal electronic components of the hand-held power tool 12. The disposition plane 30 and the further disposition plane 34 are offset parallelwise in relation to each other, in particular as viewed along a direction that is at least substantially perpendicular to a connection direction 38 of the contact elements 18, 20, 22, 24, 26, 28 (cf. FIGS. 3, 6 and 7). Advantageously, the disposition plane 30 and the further disposition plane 34 are at least substantially parallel relative to each other. Preferably, the disposition plane 30 and the further disposition plane 34 are offset relative to each other along a direction that is at least substantially perpendicular to the connection direction 38 of at least the group 32 of contact elements 18, 20, 22 (cf. FIGS. 3 and 6).

Figure 6:
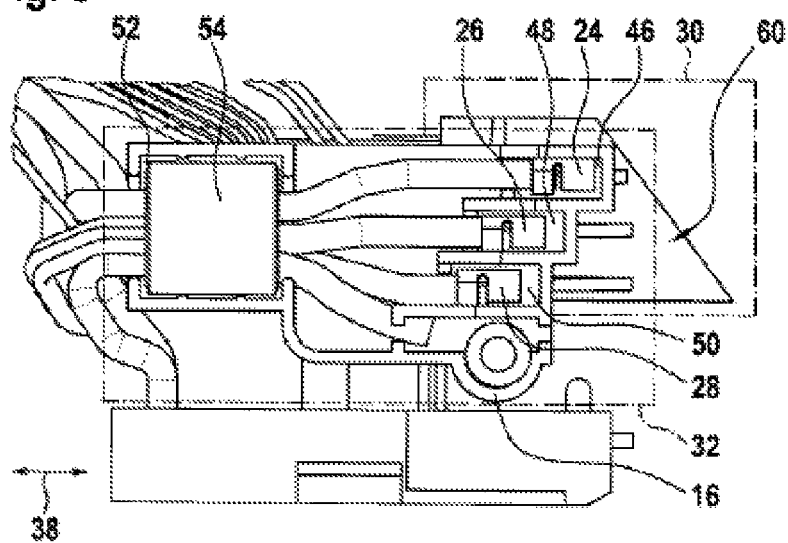

The main body 16 comprises individual accommodating chambers 40, 42, 44, disposed in the disposition plane 30, for accommodating individual contact elements 18, 20, 22 of the group 32 of contact elements 18, 20, 22 (cf. FIGS. 4, 5 and 7), and/or individual accommodating chambers 46, 48, 50, disposed in the further disposition plane 34, for accommodating individual contact elements 24, 26, 28 of the further group 36 of contact elements 24, 26, 28 (cf. FIGS. 3 and 6). The main body 16 has the individual accommodating chambers 40, 42, 44 for accommodating at least one contact element 18, 20, 22, 24, 26, 28. In the exemplary embodiment represented, as an example, in FIG. 4, the main body 16 has three individual accommodating chambers 40, 42, 44 for accommodating three contact elements 18, 20, 22, realized as tab receptacles. The contact elements 18, 20, 22 can be disposed in the individual accommodating chambers 40, 42, 44, through a mounting opening 90, 92, 94 disposed in each individual accommodating chamber 40, 42, 44, by means of a tool, not represented in greater detail here, and, in particular, can be removed again non-destructively (cf. FIG. 5). It is likewise conceivable for the contact elements 18, 20, 22, after having been disposed on the main body 16, to be over-molded and integrated into the main body 16.

The individual accommodating chambers 40, 42, 44, 46, 48, 50 preferably constitute contact-element accommodating regions of the main body 16. Preferably, the individual accommodating chambers 40, 42, 44, 46, 48, 50 are designed to shield the contact elements 18, 20, 22, 24, 26, 28. Preferably, the main body 16 comprises at least three individual accommodating chambers 40, 42, 44, which are disposed in the disposition plane 30. In particular, the main body 16 comprises at least three individual accommodating chambers 46, 48, 50, which are disposed in the further disposition plane 34. It is also conceivable, however, for the main body 16 to have a number of individual accommodating chambers 40, 42, 44, 46, 48, 50 per disposition plane 30, 34 that is other than three. The individual accommodating chambers 40, 42, 44, 46, 48, 50 separate the contact elements 18, 20, 22, 24, 26, 28 by insulating partition walls. In particular, when the housing unit 14 is in a demounted state, the individual accommodating chambers 46, 48, 50 of the further disposition plane 34 position the contact elements 24, 26, 28 in a direct field of view. Advantageously, the contact elements 24, 26, 28 can be connected with little effort by a worker (cf. FIG. 6).

The main body 16 has at least one accommodating region 52 for at least one shielding and/or filter element 54 for shielding individual contact elements 18, 20, 22, 24, 26, 28 of the group 32 of contact elements 18, 20, 22 and/or of the further group 36 of contact elements 24, 26, 28, and/or for filtering data signals (FIGS. 3 and 6). Preferably, the accommodating region 52 is realized as an accommodating chamber, in which at least one shielding and/or filter element 54, realized as a ferrite core and/or filter circuit board, can be disposed. It is also conceivable, however, for the accommodating region 52 and/or the shielding and/or filter element 54 to be of a different design, considered appropriate by persons skilled in the art.

The accommodating region 52 is preferably disposed, spaced apart relative to the individual accommodating chambers 40, 42, 44, 46, 48, 50 on the main body 16. Preferably, the accommodating region 52 is disposed in an offset manner relative to the individual accommodating chambers 40, 42, 44, 46, 48, 50 along a direction that is at least substantially parallel to the connection direction 38. In particular, the accommodating region 52 is disposed, at least partly, in the further disposition plane 34.

The main body 16 has at least one electronics accommodating region 56, in which at least one electronic unit 58, in particular a Bluetooth unit and/or an RFID unit, can be disposed (cf. FIG. 7). The main body 16 comprises at least one electronics accommodating region 56 disposed between the disposition plane 30 and the further disposition plane 34, in particular as viewed along a direction that is at least substantially perpendicular to a connection direction 38 of the contact elements 18, 20, 22, 24, 26, 28. Preferably, the electronics accommodating region 56 is disposed between the disposition plane 30 and the further disposition plane 34, in particular along a direction that is at least substantially perpendicular to the disposition plane 30 and/or the further disposition plane 34. The electronics accommodating region 56 is preferably disposed, along the direction that is at least substantially perpendicular to the disposition plane 30 and/or the further disposition plane 34, between the individual accommodating chambers 40, 42, 44 of the disposition plane 30 and the individual accommodating chambers 46, 48, 50 of the further disposition plane 34. The electronics accommodating region 56 is preferably disposed, along a direction that is at least substantially perpendicular to the connection direction 38, between the individual accommodating chambers 40, 42, 44 of the disposition plane 30 and the individual accommodating chambers 46, 48, 50 of the further disposition plane 34 (cf. FIG. 7).

The main body 16 constitutes, at least partly, an insulator between the contact elements 18, 20, 22, 24, 26, 28. The main body 16 is preferably designed to act as a thermal and/or electrical insulator between the contact elements 18, 20, 22, 24, 26, 28, in particular at least between the contact elements 18, 20, 22 of the group 32 of contact elements 18, 20, 22 and the contact elements 24, 26, 28 of the further group 36 of contact elements 24, 26, 28. In particular, the main body 16 is designed to act as a thermal and/or electrical insulator between the individual contact elements 18, 20, 22 of the group 32 of contact elements 18, 20, 22 and/or between the individual contact elements 24, 26, 28 of the further group 36 of contact elements 24, 26, 28. Preferably, the contact holder device 10 comprises at least one cooling unit 60, disposed on the main body 16, for removing heat of the contact elements 18, 20, 22, 24, 26, 28 (cf. FIG. 7).

What is claimed is:

1. A contact holder device for a hand-held power tool, comprising:
    at least one main body disposed inside a housing unit of the hand-held power tool, the main body one or more of accommodating and fixing contact elements configured to transmit data signals and/or electrical energy, the main body having at least one disposition plane with at least one group of contact elements disposed in the disposition plane,
    wherein the main body has at least one further disposition plane with at least one further group of contact elements disposed in the further disposition plane, the further disposition plane disposed in an offset manner in relation to the disposition plane,
    wherein the at least one group of contact elements and the at least one further group of contact elements are configured to contact counter-contact elements of an optional function module, which is configured, when in a coupled state, to provide an additional function that is not required for a fundamental function of the hand-held power tool.

2. A contact holder device for a hand-held power tool, comprising:
    at least one main body disposed inside a housing unit of the hand-held power tool, the main body one or more of accommodating and fixing contact elements configured to transmit data signals and/or electrical energy, the main body having at least one disposition plane with at least one group of contact elements disposed in the disposition plane,
    wherein the main body has at least one further disposition plane with at least one further group of contact elements disposed in the further disposition plane, the further disposition plane disposed in an offset manner in relation to the disposition plane,
    wherein the disposition plane and the further disposition plane are parallel to and spaced apart from each other such that the disposition plane does not intersect any contact elements of the at least one further group of contact elements and the further disposition plane does not intersect any contact elements of the at least one group of contact elements, and
    wherein the contact elements define a connection direction that is substantially parallel to the disposition and further disposition planes.

3. The contact holder device according to claim 1, wherein the main body comprises one or more of:
    individual accommodating chambers disposed in the disposition plane and configured to accommodate individual contact elements of the group of contact elements, and further individual accommodating chambers disposed in the further disposition plane and configured to accommodate individual contact elements of the further group of contact elements.

4. A contact holder device for a hand-held power tool, comprising:
   at least one main body disposed inside a housing unit of the hand-held power tool, the main body one or more of accommodating and fixing contact elements configured to transmit data signals and/or electrical energy, the main body having at least one disposition plane with at least one group of contact elements disposed in the disposition plane,
   wherein the main body has at least one further disposition plane with at least one further group of contact elements disposed in the further disposition plane, the further disposition plane disposed in an offset manner in relation to the disposition plane, and
   wherein the main body has at least one accommodating region for one or more of a shielding element and a filter element configured to one or more of (i) shield individual contact elements of one or more of the group of contact elements and the further group of contact elements and (ii) filter data signals.

5. The contact holder device according to claim 4, wherein the accommodating region is disposed, at least partly, in the further disposition plane.

6. The contact holder device according to claim 1, wherein the main body has at least one electronics accommodating region, and wherein at least one electronic unit is disposed in the electronics accommodating region.

7. A contact holder device for a hand-held power tool, comprising:
   at least one main body disposed inside a housing unit of the hand-held power tool, the main body one or more of accommodating and fixing contact elements configured to transmit data signals and/or electrical energy, the main body having at least one disposition plane with at least one group of contact elements disposed in the disposition plane,
   wherein the main body has at least one further disposition plane with at least one further group of contact elements disposed in the further disposition plane, the further disposition plane disposed in an offset manner in relation to the disposition plane, and
   wherein the main body comprises at least one electronics accommodating region that is disposed between the disposition plane and the further disposition plane as viewed along a direction that is at least substantially perpendicular to a connection direction of the contact elements.

8. The contact holder device according to claim 1, wherein the main body constitutes, at least partly, an insulator between the contact elements.

9. The contact holder device according to claim 1, further comprising at least one cooling unit disposed on the main body and configured to remove heat of the contact elements.

10. The contact holder device according to claim 6, wherein the electronic unit is one or more of a Bluetooth unit and an RFID unit.

* * * * *